United States Patent
Lahoda et al.

(10) Patent No.: US 12,500,004 B2
(45) Date of Patent: Dec. 16, 2025

(54) NUCLEAR FUEL CLADDING FOR FAST REACTORS

(71) Applicant: Westinghouse Electric Company LLC, Cranberry Township, PA (US)

(72) Inventors: Edward J. Lahoda, Edgewood, PA (US); Paolo Ferroni, Pittsburgh, PA (US); Fausto Franceschini, Lerici (IT)

(73) Assignee: Westinghouse Electric Company LLC, Cranberry Township, PA (US)

(*) Notice: Subject to any disclaimer, the term of this patent is extended or adjusted under 35 U.S.C. 154(b) by 476 days.

(21) Appl. No.: 17/996,959

(22) PCT Filed: Apr. 22, 2021

(86) PCT No.: PCT/US2021/028645
§ 371 (c)(1),
(2) Date: Oct. 24, 2022

(87) PCT Pub. No.: WO2021/216875
PCT Pub. Date: Oct. 28, 2021

(65) Prior Publication Data
US 2023/0223159 A1 Jul. 13, 2023

Related U.S. Application Data

(60) Provisional application No. 63/014,820, filed on Apr. 24, 2020.

(51) Int. Cl.
*G21C 3/07* (2006.01)
*G21C 21/02* (2006.01)

(52) U.S. Cl.
CPC ............... *G21C 3/07* (2013.01); *G21C 21/02* (2013.01)

(58) Field of Classification Search
CPC .................................. G21C 3/07; G21C 21/02
(Continued)

(56) References Cited

U.S. PATENT DOCUMENTS

| 10,593,434 B2 | 3/2020 | Lahoda |
| 2009/0220040 A1 | 9/2009 | Takagi |

(Continued)

FOREIGN PATENT DOCUMENTS

| EP | 3117439 B1 | 5/2019 |
| JP | 2009210266 A | 9/2007 |

(Continued)

OTHER PUBLICATIONS

International Search Report and Written Opinion for International PCT Application No. PCT/US2021/028645, dated Aug. 13, 2021.

*Primary Examiner* — Jack W Keith
*Assistant Examiner* — Daniel Wasil
(74) *Attorney, Agent, or Firm* — K&L Gates LLP

(57) ABSTRACT

Nuclear fuel cladding for fast reactors, assemblies thereof, and methods of manufacture thereof are provided. The nuclear fuel cladding comprises a substrate, a first layer, and a second layer. The substrate comprises a tubular shape. The first layer is deposited over an external surface of the substrate. The first layer comprises a corrosion resistant composition. The second layer is disposed over the first layer. The second layer comprises silicon carbide fibers infiltrated with silicon carbide. The second layer is configured to inhibit outward creep of the substrate. A gap is defined intermediate the first layer and the second layer.

14 Claims, 2 Drawing Sheets

(58) Field of Classification Search
USPC .......................................................... 376/416
See application file for complete search history.

(56) References Cited

U.S. PATENT DOCUMENTS

| | | |
|---|---|---|
| 2013/0010915 A1 | 1/2013 | Garnier et al. |
| 2019/0088376 A1* | 3/2019 | Lahoda .................... G21C 3/07 |

FOREIGN PATENT DOCUMENTS

| | | |
|---|---|---|
| JP | 2017515096 A | 6/2017 |
| WO | 2012174548 A1 | 12/2012 |
| WO | 2017095552 A1 | 6/2017 |
| WO | 2019060154 A2 | 3/2019 |
| WO | 2021216875 A1 | 10/2021 |

* cited by examiner

NUCLEAR FUEL CLADDING FOR FAST REACTORS

CROSS-REFERENCE TO RELATED APPLICATIONS

This application is a U.S. National Stage Entry under 35 U.S.C. § 371 of International Patent Application No. PCT/US2021/028645, entitled NUCLEAR FUEL CLADDING FOR FAST REACTORS, ASSEMBLIES THEREOF, AND METHODS OF MANUFACTURE THEREOF, filed Apr. 22, 2021, which claims benefit under 35 U.S.C. § 119 (e) to U.S. Provisional Application Ser. No. 63/014,820 filed Apr. 24, 2020, the entire disclosures of which are hereby incorporated by reference herein.

BACKGROUND

A nuclear fast reactor utilizes fast neutrons as opposed to thermal neutrons to generate power as in light water reactors. Fast reactors typically utilize a liquid metal as a coolant which can contact nuclear fuel rod bundles. Each fuel rod within the bundles can comprise nuclear fuel encased within a cladding. The cladding can be a barrier against the release of fission products from the nuclear fuel into the coolant during operation of the fast reactor. Inhibiting deterioration of the cladding presents challenges.

SUMMARY

The present disclosure provides a nuclear fuel cladding for a fast reactor. The nuclear fuel cladding comprises a substrate, a first layer, and a second layer. The substrate comprises a tubular shape. The first layer is deposited over an external surface of the substrate. The first layer comprises a corrosion resistant composition. The second layer is disposed over the first layer. The second layer comprises silicon carbide fibers infiltrated with silicon carbide. The second layer is configured to inhibit outward creep of the substrate.

The present disclosure also provides a nuclear fuel cladding for a fast reactor. The nuclear fuel cladding comprises a substrate and a layer. The substrate comprises a tubular shape and the layer is disposed over the substrate. The layer comprises silicon carbide fibers infiltrated with silicon carbide. The layer is configured to inhibit outward creep of the substrate and inhibit coolant from contacting the substrate.

The present disclosure also provides a method for preparing a nuclear fuel rod for a fast reactor. The method comprises depositing a first layer over an external surface of a substrate to form a coated substrate. The first layer comprises a corrosion resistant composition and the substrate comprises a tubular shape. Silicon carbide fibers are layered around a form to create a preform of silicon carbide fibers. The preform is infiltrated with silicon carbide utilizing liquid pre-ceramic polymers and decomposition of the liquid pre-ceramic polymers to silicon carbide, chemical vapor infiltration, chemical vapor deposition, or a combination thereof to create a second layer comprising a tubular shape. The second layer is removed from the form and the coated substrate is introduced to a cavity defined in the tubular shape of the second layer to form the nuclear fuel rod.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent, and the examples will be better understood by reference to the following description of examples taken in conjunction with the accompanying drawing, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figure 1:
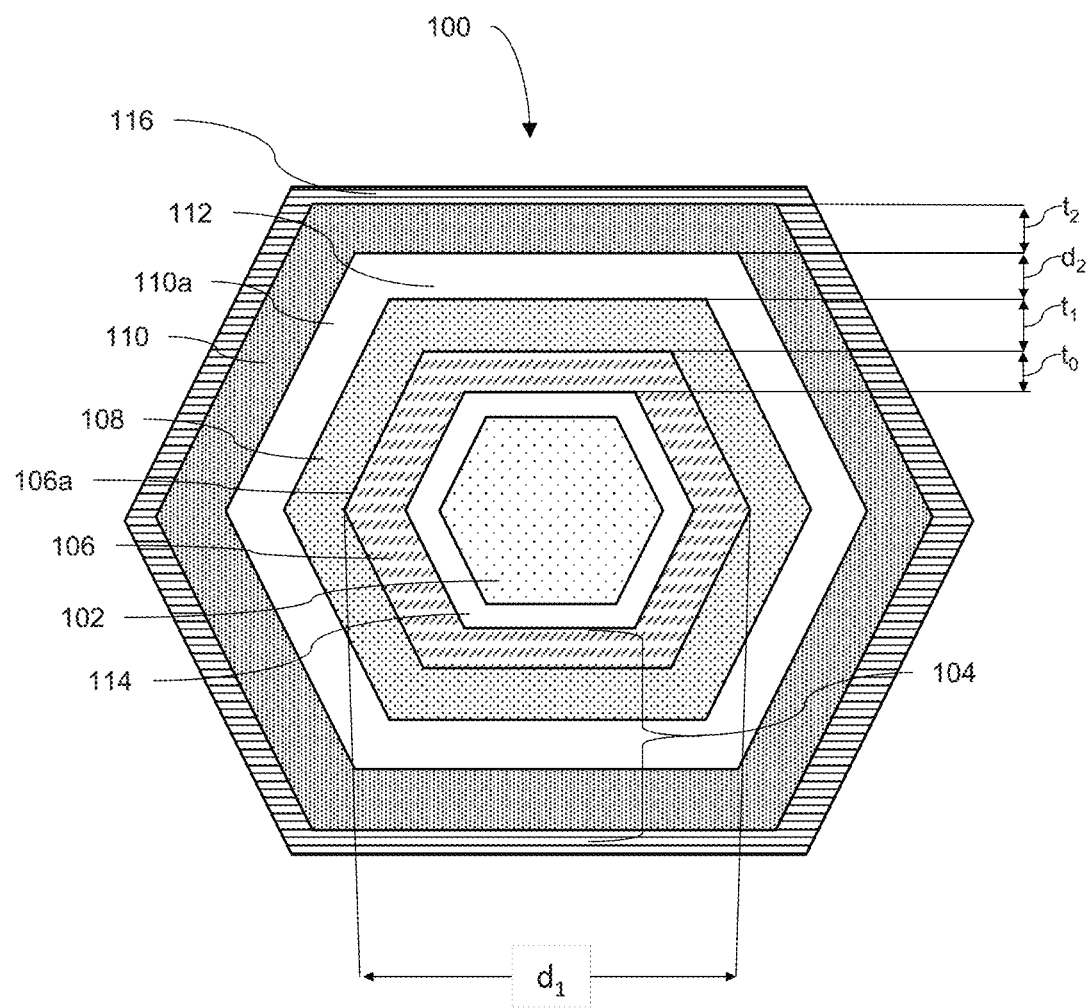
FIG. 1 is a cross section illustrating an example of a nuclear fuel rod assembly according to the present disclosure.

Certain exemplary aspects of the present disclosure will now be described to provide an overall understanding of the principles of the composition, function, manufacture, and use of the compositions, articles, and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

As used in this specification, particularly in connection with layers, the terms "on," "onto," "over," and variants thereof (e.g., "applied over," "formed over," "deposited over," "provided over," "located over," "electroplated over", and the like) mean applied, formed, deposited, provided, or otherwise located over a surface of a substrate but not necessarily in contact with the surface of the substrate. For example, a layer "applied over" a substrate does not preclude the presence of another coating layer or other coating layers of the same or different composition located between the applied coating layer and the substrate. Likewise, a second layer "applied over" a first layer does not preclude the presence of another layer or other layers of the same or different composition located between the applied second layer and the applied first layer.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Fast reactors typically comprise a core that has a liquid metal coolant (e.g., sodium, lead, lead-bismuth) and nuclear fuel rod bundles. The liquid metal coolant circulates through the core to extract heat from the nuclear fuel rod bundles. Typically, the nuclear fuel rods of the nuclear fuel rod bundles comprise a tubular shape. Each nuclear fuel rod can comprise nuclear fuel and a cladding which can be a barrier against the release of fission products from the nuclear fuel into the coolant circulating within the core of the fast reactor. For example, the nuclear fuel can be sealed within a cavity of the cladding such that the nuclear fuel does not physically contact the coolant. As the coolant temperature increases in the core of the fast reactor, typically the creep strength of the cladding decreases. Additionally, as the nuclear fuel burns during operation of the fast reactor, the nuclear fuel can produce fission gases which can pressurize the cavity within the cladding. Therefore, the combination of decrease in creep strength and increase in pressure can cause the cladding to fail.

The present inventors have determined that the cladding can form voids within its structure at high burn ups (e.g., greater than 200 MegaWatt*days per kilogram of Uranium (MWd/kgU)) which can be caused by neutron damage associated with the high burn ups. Thus, the high burn ups have been avoided for fast reactors. Further, the cladding may creep outward from the nuclear fuel and eventually fail due to void formation between the fuel and the cladding causing an increase in fuel temperature, pressure building within the cladding causing outward creep of the cladding and/or corrosion of the cladding. In various examples, corrosion of stainless steel cladding in lead fast reactors can be accelerated at temperatures of 600 degrees Celsius or greater and therefore, the lead fast reactors typically operate at temperatures of 550 degrees Celsius or less to ensure a safety margin.

Accordingly, the present disclosure provides a nuclear fuel cladding for a fast reactor which can comprise enhanced corrosion performance and enhanced creep resistance so that the cladding can maintain a desirable barrier against the release of fission products from the nuclear fuel over a variety of operational parameters of the fast reactor including increased temperatures, increased burnup rates, and increase corrosiveness of the primary coolant.

Referring to FIG. 1, a cross section of a nuclear fuel rod assembly 100 for a fast reactor is provided. The length of the nuclear fuel rod assembly 100 can be selected to suit the desired reactor type. For example, the nuclear fuel rod assembly 100 can comprise a length in a range of 1 meter (m) to 4 m for a fast reactor.

The nuclear fuel rod assembly 100 comprises nuclear fuel 102 and a nuclear fuel cladding 104. The nuclear fuel 102 can comprise uranium, a uranium alloy, a uranium compound, plutonium, a plutonium alloy, a plutonium compound, thorium, a thorium alloy, a thorium compound, or a combination thereof. The uranium, uranium alloy, or uranium compound can comprise uranium-238, uranium-235, uranium-234, or a combination thereof. The thorium, thorium alloy, or thorium compound oxide can comprise thorium-232. The plutonium, plutonium alloy, or plutonium compound can comprise plutonium-239, plutonium-240, plutonium-241, plutonium-242, plutonium-244, or a combination thereof.

In various examples, the nuclear fuel 102 comprises or consists of uranium nitride which can utilize non-isotopically separated nitrogen (e.g., UN) or isotopically separated nitrogen-15 (e.g., UN15). For example, UN15 can comprise a nitrogen-15 enrichment of at least 50% nitrogen-15 based on total nitrogen atoms within the UN15, such as, for example, at least 60% nitrogen-15, at least 70% nitrogen-15, at least 80% nitrogen-15, or at least 90% nitrogen-15 based on total nitrogen atoms within the UN15. Utilizing uranium nitride can increase the thermal conductivity of the nuclear fuel 102 which can improve reactor performance and minimize or prevent formation of an eutectic alloy between the nuclear fuel cladding 104 and the nuclear fuel 102. In various examples where the nuclear fuel 102 comprises UN or UN15, the nuclear fuel 102 can comprise a thermal conductivity of in a range of at least 15 watts/meter/degree Celsius up to 25 watts/meter/degree Celsius, depending on fuel temperature.

Typically, pure uranium nitride may not be used in a light water reactor due to the reactivity between uranium nitride and water. Therefore, uranium nitride is usually alloyed/combined with another material in order to reduce this reactivity when used in light water reactors. For example, in a light water reactor, the uranium nitride may comprise 10% to 30% by weight of zirconium to reduce reaction with water. However, the inventors have determined that this reactivity of uranium nitride may not be an issue in a fast reactor since water is typically not present and additives are not required. Fast reactor fuels such as uranium metal may comprise 10% to 30% by weight of zirconium to reduce swelling.

Additionally, the zirconium in a uranium metal fuel for a light water reactor can form an eutectic alloy with stainless steel cladding at temperatures above 750 degrees Celsius. Thus, the operating range of the uranium metal fuel comprising zirconium is usually limited to less than 600 degrees Celsius. However, the present inventors have determined that since pure uranium nitride may be used in a fast reactor, the eutectic alloy can be avoided while maintaining increased uranium density and high fuel thermal conductivity. The increased uranium density as compared to uranium dioxide may also lead to enhanced efficiencies in operation of the fast reactor. In various examples, the nuclear fuel 102 can comprise greater than 90% of uranium nitride by weight, such as, for example, at least 91% uranium nitride by weight, at least 95% uranium nitride by weight, at least 99% uranium nitride by weight, or at least 99.9% uranium nitride by weight.

In various examples where the nuclear fuel 102 comprises uranium nitride, the nuclear fuel 102 can have a melting point of greater than 2500 Kelvin, such as, for example or greater than 3000 Kelvin, depending on the burn up of the uranium nitride. In various examples where the nuclear fuel 102 comprises uranium nitride, the nuclear fuel 102 can have a melting point of 3123 Kelvin. The enhanced melting point of the nuclear fuel 102 can enable an increase operating temperature of the coolant in the core of the fast reactor and/or an increase safety factor during operation of the fast reactor.

The nuclear fuel cladding 104 can be spaced from the nuclear fuel 102 by a gap 114 (e.g., void space). The gap 114 can be in a range of 0.05 mm to 2 mm, such as, for example, 0.2 mm to 1 mm, or 0.5 mm to 1 mm. The gap 114 may not be uniform between the nuclear fuel 102 and the nuclear fuel cladding 104 and the nuclear fuel 102 may contact the nuclear fuel cladding 104 at certain locations.

The nuclear fuel cladding 104 can comprise a tubular shape. In various examples, the nuclear fuel cladding 104 can comprise a hexagonal tubular shape as illustrated in FIG. 1. In various other examples, the nuclear fuel cladding 104 can be a different shape, such as, for example, generally cylindrical (not shown).

The nuclear fuel cladding 104 can comprise a substrate 106, an optional first layer 108, and a second layer 110. The substrate 106 can comprise a tubular shape. For example, as illustrated, the substrate 106 comprises a hexagonal tubular shape. The substrate 106 can comprise zirconium, a zirconium alloy, iron, an iron alloy, or a combination thereof. For example, the substrate 106 can comprise a martensitic stainless steel alloy, an austenitic stainless steel alloy, or a nuclear grade zirconium alloy. The nuclear grade zirconium alloy can comprise Zircalloy-2™, Zircalloy-4™, ZIRLO™, optimized ZIRLO™, or a combination thereof. For example, the nuclear grade alloy can comprise a zirconium alloy composition comprising, all based on the total weight of the zirconium alloy: 0.5% to 2.0% niobium; 0.7% to 1.5% tin; 0.07% to 0.14% iron; up to 0.03% carbon; up to 0.2% oxygen; and balance zirconium and incidental impurities. The martensitic stainless steel alloy can comprise HT-9. The austenitic stainless steel alloy can comprise 15-15Ti or Alumina Forming Austenitic (AFA) steel.

The substrate 106 can comprise a wall thickness, $t_0$, in a range of 0.2 mm to 1 mm, such as, for example, 0.4 mm to 0.7 mm or 0.5 mm to 0.6 mm. The external diameter, $d_1$, of the substrate 106 can be in a range of 5 mm to 15 mm, such as, for example, 7 mm to 12 mm, such as, for example, 8 mm to 11 mm or 9 mm to 10 mm.

The first layer 108 can be deposited over an external surface 106a of the substrate 106. The first layer 108 can comprise a corrosion resistant composition. For example, the first layer 108 can be directly in contact with the substrate 106. The corrosion resistant composition can be configured to inhibit oxidation and/or chemical degradation of the substrate 106 at various operation conditions including operating temperatures of at least 600 degrees Celsius. For example, the second layer 110 may be porous and enable fluid (e.g., coolant in the core of the fast reactor) transport through the second layer 110 such that the fluid can contact the first layer 108. The first layer 108 can substantially coat the external surface 106a of the substrate 106 and the first layer 108 can be substantially impermeable to the fluid. Therefore, the first layer 108 can inhibit or prevent the fluid from contacting the substrate 106.

Additionally, the first layer 108 can be resistant to oxidation and/or chemical degradation due to contact with the coolant thereby enhancing the operational range of the nuclear fuel rod assembly 100 in a fast reactor. The first layer 108 can comprise titanium, a titanium alloy, aluminum, an aluminum alloy, chromium, a chromium alloy, zirconium, a zirconium alloy, a ceramic, or a combination thereof. For example, the corrosion resistant composition can comprise $Ti_2AlC$, TiAlN, $Zr_2AlC$, chromium, chromium nitride, alumina, or a combination thereof. In various examples, the corrosion resistant composition can comprise $Ti_2AlC$, TiAlN, $Zr_2AlC$, or a combination thereof.

The first layer 108 can comprise a thickness, $t_1$, in a range of 0.1 microns to 10 microns, such as, for example, 1 micron to 10 microns, 2 microns to 8 microns, 2 microns to 6 microns, or 3 to 5 microns.

The second layer 110 can be disposed over the first layer 108 and a gap 112 (e.g., void space) can be defined intermediate the first layer 108 and the second layer 110. For example, the second layer 110 can be formed in a tubular shape comprising a cavity 110a and the assembly of the substrate 106 and first layer 108 can be inserted therein. The gap 112 can enable the substrate 106 and first layer 108 to expand a predetermined amount prior to engaging and/or being restrained by the second layer 110. The gap 112 can comprise a dimension, $d_2$, in a range of 50 microns to 2000 microns, such as, for example, 100 microns to 1000 microns, 500 microns to 1000 microns, 400 microns to 900 microns, or 600 microns to 800 microns. The gap 112 may not be uniform between the second layer 110 and the first layer 108 and the first layer 108 may contact the second layer 110 at certain locations.

The second layer 110 can be configured to inhibit outward creep of the substrate 106 and first layer 108 relative to the nuclear fuel 102 and/or restrain the substrate 106 and first layer 108. The second layer 110 can comprise silicon carbide fibers infiltrated with silicon carbide which can thereby form a hard, strong, and/or durable structure to support the shape of the substrate 106. Silicon carbide can retain a desired hardness, strength, and durability over a varying temperature range, including temperatures of at least 600 degrees Celsius. Thus, the second layer 110 can thereby restrain the substrate 106 over the varying temperature range as well.

The silicon carbide fibers of the second layer 110 can be infiltrated by liquid pre-ceramic polymers and decomposition of the liquid pre-ceramic polymers to silicon carbide, chemical vapor infiltration, chemical vapor deposition, or a combination thereof. Chemical vapor infiltration is a process where a gaseous material is infiltrated into a porous preform at elevated temperatures. For example, chemical vapor infiltration of silicon carbide fibers can comprise heating the silicon carbide fibers in a reactor to an elevated temperature (e.g., at least 1000 degrees Celsius) and introducing a gaseous material to the reactor including the pores of the silicon carbide fibers. The gaseous materials can comprise a silicon carbide precursor (e.g., trichloromethylsilane) and an optional diluent (e.g., nitrogen). The trichloromethylsilane degrades into silicon carbide and hydrogen chloride at the elevated temperature. The silicon carbide is deposited onto the silicon carbide fibers including within the pores and/or on the surface of the silicon carbide fibers and the hydrogen chloride can be removed from the reactor. In various examples, an interlayer may be formed on the silicon carbide fibers prior to introducing the gaseous material. Chemical vapor deposition is similar to chemical vapor infiltration except the silicon carbide is deposited more on the surface of the silicon carbide fibers in chemical vapor deposition than in the pores of the silicon carbide fibers.

In various examples, the silicon carbide fibers of the second layer 110 can be infiltrated by a combination of chemical vapor infiltration and chemical vapor deposition to achieve a desired porosity and/or thickness, $t_2$, of the second layer 110. The second layer 110 can comprise a thickness, $t_2$, in a range of 30 microns to 500 microns, such as, for example, 40 microns to 500 microns, 50 microns to 500 microns, 50 microns to 200 microns, 80 microns to 200 microns, or 50 microns to 100 microns. The second layer 110 can comprise a porosity in a range of 5% to 30% by volume, such as, for example, 5% to 20%, 5% to 15%, 10% to 15%, or 5% to 10%, all based on volume. The porosity may enable higher thermal transport during operation of the nuclear fuel rod assembly 100 since the coolant can penetrate through the second layer 110.

In various examples, it may be desired to decrease the permeability of the second layer 110 to prevent the penetration through the second layer 110. For example, additional chemical vapor deposition of silicon carbide can be used to form a substantially impermeable tertiary layer 116 on the second layer 110. In various examples, the first layer 108 may not be used where the tertiary layer 116 is used. For example, the tertiary layer 116 can inhibit or prevent the coolant in the core of a fast reactor from contacting the substrate 106. Additionally, silicon carbide can be corrosion resistant. In various other examples, another layer (not shown) can be deposited on the opposing side of the second layer 110 than the tertiary layer 116 in place of or in conjunction with the tertiary layer 116. In various examples, the nuclear fuel rod assembly 100 can be configured for use in a light water reactor by inhibiting penetration of coolant through the second layer 110. For example, it may be desired to inhibit steam from penetrating through the second layer 110 which can provide an insulative property to the nuclear fuel rod assembly 100.

A nuclear fuel bundle can be created from multiple units of the nuclear fuel rod assembly 100 by assembling them in a hexagonal or square close packing relationship. Thereafter, the nuclear fuel bundle can be placed into a fast reactor. The fast reactor can comprise a liquid metal coolant, such as, for example, sodium, a sodium alloy, lead, a lead alloy (e.g., lead alloy comprising bismuth), or a combination thereof. For example, the fast reactor can be a lead fast reactor that utilizes a lead or lead alloy coolant. The lead fast reactor can be operated at a core coolant temperature of at least 600 degrees Celsius utilizing the nuclear fuel rod assembly 100, such as, for example, at least 700 degrees Celsius, at least 800 degrees Celsius, at least 900 degrees Celsius, at least 1000 degrees Celsius, or at least 1400 degrees Celsius. The high temperature operation of the core coolant can be achieved by the inhibition of the outward creep of the substrate 106 by the second layer 110 and/or the corrosion prevention by the first layer 108 and/or tertiary layer 116. Increasing the operation temperature of the coolant in the core of the fast reactor can increase the efficiency of the energy conversion process in a fast reactor.

In various examples, the fast reactor can operate the nuclear fuel rod assembly 100 at a at a burnup of at least 300 MWd/kgU, such as, for example, at least 350 MWd/kgU or at least 400 MWd/kgU. The increased burnup can increase the economic efficiency of the fast reactor.

Figure 2:
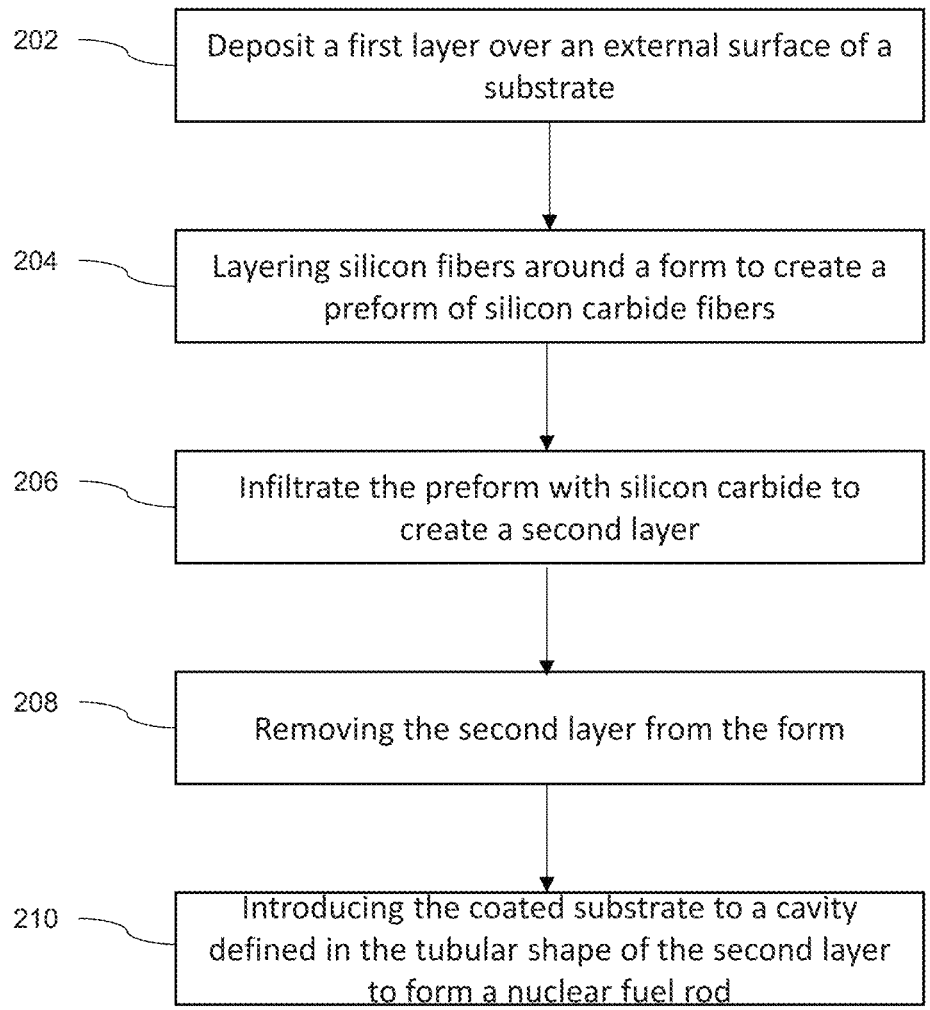
FIG. 2 is a process diagram illustrating an example of method for making a nuclear fuel rod assembly according to the present disclosure.

Referring to FIG. 2, a method for preparing a nuclear fuel rod for a fast reactor is provided. As illustrated, the method can comprise depositing an optional first layer over an external surface of a substrate to form a coated substrate, 202. The first layer comprises a corrosion resistant composition. The first layer can be deposited by physical vapor deposition, cold spray, thermal spray, or a combination thereof.

The method can comprise layering silicon fibers around a form to create a preform of silicon carbide fibers, 204. The form can be a tube, a mandrel, or similar object. Layering can comprise depositing, wrapping, braiding, winding, or combinations thereof. The preform of silicon carbide fibers can comprise a porosity in a range of 30% to 60% prior to infiltration with silicon carbide, such as, for example, a porosity of greater than 30% up to 60% or 35% to 60%.

The preform of silicon carbide fibers can be infiltrated with silicon carbide to form a second layer comprising a tubular shape utilizing liquid pre-ceramic polymers and decomposition of the liquid pre-ceramic polymers to silicon carbide, chemical vapor infiltration, chemical vapor deposition, or a combination thereof, 206. The infiltration of the preform with silicon carbide can decrease the porosity of the silicon carbide preform and increase the rigidity of the preform. In various examples, the process of infiltration can comprise chemical vapor infiltration and then chemical vapor deposition. In certain examples, the process of infiltration can comprise chemical vapor deposition, chemical vapor infiltration, and then chemical vapor deposition. In various examples, chemical vapor deposition is performed on the form prior to layering silicon fibers around the form.

The second layer can be removed from the form, 208. The coated substrate can be introduced to a cavity defined in the tubular shape of the second layer to form the nuclear fuel rod, 210. In various examples, a gap can be defined intermediate the first layer and the second layer when introducing the coated substrate to the cavity. In other examples, nuclear fuel can be inserted into and sealed within the substrate.

Various aspects of the invention according to the present disclosure include, but are not limited to, the aspects listed in the following numbered clauses.

1. A nuclear fuel cladding for a fast reactor, the nuclear fuel cladding comprising:
    a substrate comprising a tubular shape;
    a first layer deposited over an external surface of the substrate, wherein the first layer comprises a corrosion resistant composition; and
    a second layer disposed over the first layer, the second layer comprising silicon carbide fibers infiltrated with silicon carbide, the second layer configured to inhibit outward creep of the substrate.

2. The nuclear fuel cladding of clause 1, wherein the silicon carbide fibers are infiltrated with silicon carbide by liquid pre-ceramic polymers and decomposition of the liquid pre-ceramic polymers to silicon carbide, chemical vapor infiltration, chemical vapor deposition, or a combination thereof.

3. The nuclear fuel cladding of any one of clauses 1-2, wherein a gap is defined intermediate the first layer and the second layer.

4. The nuclear fuel cladding of any one of clauses 1-3, wherein the corrosion resistant composition comprises titanium, a titanium alloy, aluminum, an aluminum alloy, chromium, a chromium alloy, zirconium, a zirconium alloy, a ceramic, or a combination thereof.

5. The nuclear fuel cladding of any one of clauses 1-4, wherein the corrosion resistant composition comprises Ti2AlC, TiAlN, Zr2AlC, chromium, chromium nitride, alumina, or a combination thereof.

6. The nuclear fuel cladding of any one of clauses 1-5, wherein the substrate comprises zirconium, zirconium alloy, iron, an iron alloy, or a combination thereof.

7. The nuclear fuel cladding of any one of clauses 1-6, wherein the substrate comprises a martensitic stainless steel alloy, an austenitic stainless steel alloy, or a nuclear grade zirconium alloy.

8. The nuclear fuel cladding of any one of clauses 1-7, wherein the second layer comprises a porosity in a range of 5% to 30% by volume.

9. The nuclear fuel cladding of any one of clauses 1-8, wherein the first layer comprises a thickness in a range of 0.1 microns to 10 microns.

10. The nuclear fuel cladding of any one of clauses 1-9, wherein the second layer comprises a thickness in a range of 30 microns to 500 microns.

11. A nuclear fuel rod assembly comprising:
    the nuclear fuel cladding of any one of clauses 1-10; and
    a nuclear fuel disposed within the nuclear fuel cladding.

12. The nuclear fuel rod assembly of clause 11, wherein the nuclear fuel comprises uranium, a uranium alloy, a uranium compound, plutonium, a plutonium alloy, a plutonium compound, thorium, a thorium alloy, a thorium compound, or a combination thereof.

13. The nuclear fuel rod assembly of any one of clauses 11-12, wherein the nuclear fuel comprises uranium nitride.

14. A fast reactor nuclear power plant comprising the nuclear fuel assembly of any one of clauses 11-13.

15. A method comprising operating a lead fast reactor nuclear power plant at an operating temperature of greater than 600 degrees Celsius utilizing the nuclear fuel assembly of any one of clauses 11-13.

16. A nuclear fuel cladding for a liquid metal fast reactor, the nuclear fuel cladding comprising:
   a substrate comprising a tubular shape; and
   a layer disposed over the substrate, the layer comprising silicon carbide fibers infiltrated with silicon carbide, the layer configured to inhibit outward creep of the substrate and inhibit coolant from contacting the substrate.

17. A method for preparing a nuclear fuel rod for a liquid metal fast reactor, the method comprising:
   depositing a first layer over an external surface of a substrate to form a coated substrate, wherein the first layer comprises a corrosion resistant composition and wherein the substrate comprises a tubular shape;
   layering silicon carbide fibers around a form to create a preform of silicon carbide fibers;
infiltrating the preform with silicon carbide utilizing chemical vapor infiltration, chemical vapor deposition, or a combination thereof to create a second layer comprising a tubular shape;
removing the second layer from the form; and
introducing the coated substrate to a cavity defined in the tubular shape of the second layer to form the nuclear fuel rod.

18. The method of clause 17 wherein the preform comprises a porosity in a range of 30% to 60% prior to infiltration with silicon carbide.

19. The method of any one of clauses 17-18 further comprising introducing a nuclear fuel comprising uranium nitride to a cavity defined in the substrate.

20. The method of any one of clauses 17-18 wherein the first layer is deposited by physical vapor deposition, cold spray, thermal spray, or a combination thereof.

Those skilled in the art will recognize that the herein described compositions, articles, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, nuclear fuel assembly, or method that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or one or "more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Whereas particular examples of this invention have been described above for purposes of illustration, it will be evident to those skilled in the art that numerous variations of the details of the present invention may be made without departing from the invention as defined in the appended claims.

What is claimed is:

1. A nuclear fuel cladding for a fast reactor, the nuclear fuel cladding comprising:
    a substrate comprising a tubular shape;
    a first layer deposited over an external surface of the substrate,
        wherein the first layer comprises a corrosion resistant composition;
    a second layer disposed over the first layer,
        the second layer comprising silicon carbide fibers infiltrated with silicon carbide,
        the second layer configured to inhibit outward creep of the substrate; and
    a gap is defined intermediate the first layer and the second layer.

2. The nuclear fuel cladding of claim 1, wherein the silicon carbide fibers are infiltrated with silicon carbide by liquid pre-ceramic polymers and decomposition of the liquid pre-ceramic polymers to silicon carbide, chemical vapor infiltration, chemical vapor deposition, or a combination thereof.

3. The nuclear fuel cladding of claim 1, wherein the corrosion resistant composition comprises titanium, a titanium alloy, aluminum, an aluminum alloy, chromium, a chromium alloy, zirconium, a zirconium alloy, a ceramic, or a combination thereof.

4. The nuclear fuel cladding of claim 1, wherein the corrosion resistant composition comprises $Ti_2AlC$, TiAlN, $Zr_2AlC$, chromium, chromium nitride, alumina, or a combination thereof.

5. The nuclear fuel cladding of claim 1, wherein the substrate comprises zirconium, zirconium alloy, iron, an iron alloy, or a combination thereof.

6. The nuclear fuel cladding of claim 1, wherein the substrate comprises a martensitic stainless steel alloy, an austenitic stainless steel alloy, or a nuclear grade zirconium alloy.

7. The nuclear fuel cladding of claim 1, wherein the second layer comprises a porosity in a range of 5% to 30% by volume.

8. The nuclear fuel cladding of claim 1, wherein the first layer comprises a thickness in a range of 0.1 microns to 10 microns.

9. The nuclear fuel cladding of claim 1, wherein the second layer comprises a thickness in a range of 30 microns to 500 microns.

10. A nuclear fuel rod assembly comprising:
    the nuclear fuel cladding of claim 1; and
    a nuclear fuel disposed within the nuclear fuel cladding.

11. The nuclear fuel rod assembly of claim 10, wherein the nuclear fuel comprises uranium, a uranium alloy, a uranium compound, plutonium, a plutonium alloy, a plutonium compound, thorium, a thorium alloy, a thorium compound, or a combination thereof.

12. The nuclear fuel rod assembly of claim 10, wherein the nuclear fuel comprises uranium nitride.

13. A fast reactor comprising the nuclear fuel assembly of claim 10.

14. A method comprising operating a lead fast reactor at an operating temperature of greater than 600 degrees Celsius utilizing the nuclear fuel assembly of claim 10.

* * * * *